US012025540B2

(12) United States Patent
Maccio

(10) Patent No.: US 12,025,540 B2
(45) Date of Patent: Jul. 2, 2024

(54) PORTABLE SAMPLER TO DETECT MICROORGANISMS INCLUDING SARS-CoV-2 IN THE AIR

(71) Applicant: EUDIKA S.A., Montevideo (UY)

(72) Inventor: Laura Maccio, Montevideo (UY)

(73) Assignee: EUDIKA S.A., Montevideo (UY)

( * ) Notice: Subject to any disclaimer, the term of this patent is extended or adjusted under 35 U.S.C. 154(b) by 0 days.

(21) Appl. No.: 17/385,071

(22) Filed: Jul. 26, 2021

(65) Prior Publication Data

US 2022/0026318 A1 Jan. 27, 2022

(30) Foreign Application Priority Data

Jul. 27, 2020 (UY) .......................................... 38805

(51) Int. Cl.

*G01N 1/24* (2006.01)
*G01N 1/14* (2006.01)
*G01N 1/20* (2006.01)
*G01N 1/22* (2006.01)

(52) U.S. Cl.

CPC ................. *G01N 1/24* (2013.01); *G01N 1/14* (2013.01); *G01N 1/2035* (2013.01); *G01N 1/2202* (2013.01); *G01N 1/2205* (2013.01); *G01N 1/2273* (2013.01); *G01N 2001/2223* (2013.01); *G01N 2001/245* (2013.01)

(58) Field of Classification Search

CPC .................. G01N 1/24; G01N 1/2205; G01N 2001/2223; G01N 2001/245; G01N 1/14; G01N 1/2035

USPC ...................................................... 73/863.23

See application file for complete search history.

(56) References Cited

U.S. PATENT DOCUMENTS 3,295,359 A * 1/1967 Peck .................... G01N 1/2202 73/28.04
5,500,369 A * 3/1996 Kiplinger ............. G01N 1/2208 73/863.41
6,192,767 B1 2/2001 Fiorina
7,267,017 B1 * 9/2007 Bodnar .................... G01N 1/24 73/863.23
10,859,473 B2 * 12/2020 Wu .................. G01N 33/54366

(Continued)

FOREIGN PATENT DOCUMENTS

CN 112461615 A * 3/2021
JP 2016525688 A * 8/2016 ............. C12M 1/26

(Continued)

OTHER PUBLICATIONS

International Searching Authority, Written Opinion, PCT/EP2021/081885, Nov. 12, 2020, 12 pg(s) (Year: 2020).*

(Continued)

*Primary Examiner* — Stephanie E Bloss
*Assistant Examiner* — Kevin C Butler
(74) *Attorney, Agent, or Firm* — Hoglund & Pamias, PSC; Roberto J. Rios

(57) ABSTRACT

A device is described for collecting samples of microorganisms in the air, such as bacteria, fungi, viruses, including SARS-CoV-2; intuitive to use, portable, and does not require specific technical knowledge to handle. The device works through an air flow sucked in by a centrifugal fan, where a filter retains the microorganisms for later use in diagnostic laboratories.

10 Claims, 5 Drawing Sheets

(56) References Cited

U.S. PATENT DOCUMENTS

| | | | | |
|---|---|---|---|---|
| 2003/0005761 | A1 * | 1/2003 | Spurrell | G01N 1/2208 73/170.16 |
| 2003/0008341 | A1 * | 1/2003 | Spurrell | G01N 1/2208 435/287.1 |
| 2005/0068040 | A1 * | 3/2005 | Mitchell | G01N 1/2202 324/457 |
| 2005/0136507 | A1 * | 6/2005 | Sullivan | C12Q 1/24 435/309.1 |
| 2005/0260569 | A1 | 11/2005 | Houde et al. | |
| 2022/0026318 | A1 * | 1/2022 | Maccio | G01N 1/2273 |
| 2022/0397494 | A1 * | 12/2022 | Packingham | G01N 1/2205 |

FOREIGN PATENT DOCUMENTS

| | | | | |
|---|---|---|---|---|
| WO | WO-03081212 A2 | * | 10/2003 | G01N 1/2205 |
| WO | WO-2005030272 A2 | * | 4/2005 | G01N 1/2202 |
| WO | WO-2015138695 A2 | * | 9/2015 | C12Q 1/24 |
| WO | WO-2017044536 | * | 3/2017 | B03C 3/32 |
| WO | WO-2017044536 A1 | * | 3/2017 | B03C 3/32 |
| WO | WO-2019194890 A1 | * | 10/2019 | B01D 46/0027 |
| WO | WO-2022101510 A1 | * | 5/2022 | F24F 8/125 |

OTHER PUBLICATIONS

Angelo Robotto et al., SARS-CoV-2 and indoor/outdoor air samples: a methodological approach to have consistent and comparable results, Environmental Research 195, Elsevier, Feb. 2021, 7 pg(s) (Year: 2017).*

Pan et al., Efficient collection of viable virus aerosol through laminar-flow, water-based condensational particle growth, Journal of Applied Microbiology 120, 805-815, 2016 (Year: 2016).*

Pan et al., Collection, particle sizing and detection of airborne viruses, Journal of Applied Microbiology 127, 1596-1611, 2019 (Year: 2019).*

C.W. Haig et al., Bioaerosol sampling: sampling mechanisms, bioefficiency and field studies, Journal of Hospital Infection 93, 2016, pp. 242-255 (Year: 2016).*

Burton et al., Physical collection efficiency of filter materials for bacteria and viruses, Ann. Occup. Hyg., vol. 51, No. 2, pp. 143-151, 2007 (Year: 2007).*

João Tito Borges et al. 2021 SARS-CoV-2: a systematic review of indoor air sampling for virus detection, Environmental Science and Pollution Research, Springer, 2021, 14 pg(s) (Year: 2021).*

Angelo Robotto et al., SARS-CoV-2 and indoor/outdoor air samples: a methodological approach to have consistent and comparable results, Environmental Research 195, Elsevier, Feb. 2021, 7 pg(s) (Year: 2021).*

Verreault et al., Methods for Sampling of Airborne Viruses, Microbiology and Molecular Biology Reviews, vol. 72, No. 3, Sep. 2008, p. 413-444 (Year: 2008).*

International Searching Authority, Written Opinion, PCT/EP2021/081885, Nov. 12, 2020, 2020, 12 pg(s) (Year: 2020).*

International Searching Authority, International Search Report, PCT/EP2021/081885, Nov. 16, 2020, 5 pg(s) (Year: 2020).*

Abbas Mohammadi et al., SARS-CoV-2 detection in different respiratory sites: A systematic review and meta-analysis, EBioMedicine 59, Elsevier, 2020, pp. 2352-3964 (Year: 2020).*

Verreault D., Moineau S. and Duchaine C., Methods for Sampling of Airborne Viruses. Microbiology and Molecular Biology Reviews, 2008, p. 413-444.

Kampf G., Todt D., Pfaender S., Steinmann E., Persistence of coronaviruses on inanimate surfaces and their inactivation with biocidal agents, 2020, 246-251.

Yongjian Z., Jingui X., Fengming H., Liqing C., Association between short-term exposure to air pollution and COVID-19 infection: Evidence from China, 2020, 138704.

* cited by examiner

PORTABLE SAMPLER TO DETECT MICROORGANISMS INCLUDING SARS-CoV-2 IN THE AIR

BACKGROUND OF THE INVENTION

It is known in the state of the art that "any microorganism, including viruses, can pass into the air. Contaminated material can be aerosolized in many different ways, from the wind to human and animal activities such as sneezing, mechanical processes, etc. If the aerodynamic size of an infectious particle is appropriate, it can remain in the air, come into contact with humans or animals, and potentially cause an infection. The probability that a particle loaded with microorganisms in the air will cause an infection depends on its infectious potential and its ability to resist aerosolization stress" (Verreault D., Moineau S. and Duchaine C. (2008). Methods for Sampling of Airborne Viruses. Microbiology and Molecular Biology Reviews, p. 413-444.)

Not all microorganisms cause diseases, however, the so-called pathogens would be responsible for various human diseases such as: hepatitis, HIV, salmonella, flu to acute respiratory diseases such as Middle East Respiratory Syndrome (MERS), Severe Acute Respiratory Syndrome (SARS) and now the new coronavirus called SARS-CoV-2 that causes the disease called COVID-19 identified by first time in December 2019 in Wuhan, China.

The main difference between them lies in the environment in which they live, such as the mode, medium and speed of contagion.

The transmission potential of microorganisms can vary according to their morphological characteristics, as well as their ability to survive certain temperatures and contact surfaces. An "analysis of 22 studies reveals that human coronaviruses such as the Severe Acute Respiratory Syndrome (SARS) coronavirus, the Middle East Respiratory Syndrome coronavirus (MERS) or endemic human coronaviruses (HCoV) can persist on inanimate surfaces such as metal, glass or plastic for up to 9 days" (Kampf G., Todt D., Pfaender S., Steinmann E. (2020). Journal of Hospital Infection, 105(3): pp 587).

On the other hand, "a virus can only multiply within a host cell. Infected cells can spread viruses directly into the surrounding air (primary aerosolization) or onto fluids and surfaces, which can become sources of airborne transmission (secondary aerosolization). Secondary aerosolization can occur for any virus, predominantly when air displacements or movements around contaminated surfaces or fluids disperse viruses into the air. It can also occur from liquid splashes, which can aerosolize viruses in liquids or on surfaces. In fact, almost any type of disturbance of infected organisms or materials, even the bursting of bubbles in seawater, can produce virus-laden airborne particles" (Verreault D., Moineau S. and Duchaine C. (2008). Methods for Sampling of Airborne Viruses. Microbiology and Molecular Biology Reviews, p. 413-444.).

Airborne microorganisms can represent important risks to human health, animals and the economy of populations, however, with the recent pandemic caused by SARS-CoV-2 (Covid-19), studies have been carried out whose results would indicate that the level of air pollution and type of particles present, would facilitate and increase the severity of respiratory infections of the viral type and their adverse effects especially for humans (Science of the Total Environment 727 (2020) 138704).

Currently, in the state of the art, various specialized air sampling equipment for the collection and detection of microorganisms present in controlled environments, such as the hospital, industrial and pharmaceutical sectors, as well as other detection equipment used in office's air conditioning and ventilation duct systems are known.

It is also known in the state of the art that this equipment requires specialized knowledge to be used, preventing its application in uncontrolled environments, but highly susceptible and sensitive to infectious factors such as nurseries, schools, homes, private residences, hotels, or public venues, among others.

In the current state of the art, it is known the existence of patented products for commercial and industrial use of continuous use, which require installation, manipulation and specialized supervision. Ref. US 20050260569 A1 to House M. & Grenier M. issued on Nov. 24, 2005.

Or in contrast to this, the existence of equipment that are not specialized in collecting environmental samples, since it considers other functionalities not associated with the collection or measurement of pathogenic microorganisms present in the environment. Ref: U.S. Pat. No. 6,192,767 B1 to Fiorina A. issued on Feb. 27, 2001.

In the state of the art there are commercial devices aimed at specialized food, pharmaceutical, hospital and controlled environments industries which require specialized handling and supervision, not suitable for uncontrolled environments and users without sampling and laboratory technical knowledge, such as:

MAS-100 Eco®—Merck

- Use: Microbial contamination detection and air quality testing. Recommended for air sampling in the food and beverage industry.
- Features: Reprogrammable delay of sampling start, 6 individually adjustable preselected volumes. Perforated aluminum lid with 400 holes.

Mas—100 NT®—Merck

- Use: Microbial contamination detection and air quality testing. Recommended for clean rooms, pharmaceutical industry, hospitals and food industry.
- Features: Larger sampling heads available upon request. Programmable delay of sampling start, 6 individually adjustable preselected volumes. Perforated aluminum cap with 300 0.6 mm holes. Registration of up to 100 samples with date, time, user and volume.

SAS Super IAQ—VWR Collection

- Use: Microbial contamination detection and air quality testing. Recommended for air sampling in the agri-food and environmental sector.
- Features: Can be used in any controlled environment.

DUO SAS Super 360—VWR Collection

- Use: Microbial contamination detection and air quality testing. Recommended for situations of low environmental contamination and high quantities of required samples.
- Features: Double head. Use of different mediums in each head in the same sampling cycle. Operational speed.

OXOID Em100—Thermo Scientific

- Use: Microbial contamination detection and air quality testing. Recommended for use in food and pharmaceutical production areas or in clinical settings.
- Features: 100% effective for particles from 0.8 to 19.0 microns. Air intake with real-time electronic control of the actual air flow (through 219 holes).

MiniCapt Mobile—PMS

Use: Microbial contamination detection and air quality testing. Recommended for clean rooms, pharmaceutical industry, hospitals and food industry.

Features: High resolution touch screen. It has a HEPA filter on the exhaust. The radial slit design ensures optimal recovery for microorganisms during sampling. These slits also ensure laminar flow, making false positive identification easier.

SAS Super 100-180—Bioscience Int.

Use: Microbial contamination detection and air quality testing. Recommended for use in clean rooms, hospitals, or research sites.

Features: 100% effective for particles down to 1 micron. Records volume of air sampled and other data that ensure traceability.

Airwell—Alliance Bio Expertise

Use: Microbial contamination detection and air quality testing. Recommended for use in clean rooms, hospitals, or research sites.

Features: 00% effectiveness for particles up to 1 micron. Records volume of air sampled and other data that ensure traceability. Antibacterial body paint without generation of particles in clean room.

SAMPL'AIRTM—Biomerieux

Use: Microbial contamination detection and air quality testing. Recommended for hospitals, pharmaceutical manufacturing areas, etc.

Features: Pro version includes traceability functions and PC/printer connection. Adjustable sampling volume from 50 liters to 10 m3. Infrared remote control.

Air Ideal—Biomerieux

Use: Microbial contamination detection and air quality testing. Recommended for clinical labs, cosmetics/personal care, pharmacy, food, etc.

Features: Sterilizable in autoclave at 134° C. for 18 minutes. Design guarantees a new continuous air intake (sucked air is evacuated on air intake opposite site). 100% effectiveness on particles larger than 5 mm. Almost all particles between 3 and 10 mm are collected.

Krisk Life Science Solutions

Use: Microbial contamination detection and air quality testing. Recommended for clean rooms, pharmaceutical industry, hospitals and food industry.

Features: Has many small sampling holes to reduce particle overlap and reduce colony counting error. Brushless motor ensures a minimum emission of particles in clean rooms.

Equiteq

Use: Microbial contamination detection and air quality testing. Recommended for hospitals (Hs, ICU, ICCU, etc.), food processing plants, etc.

Features: It has a timing circuit. Temperatures: −20 to 70° C. Speed: 5000 rpm.

Air sampling device—GASTEC

Use: Small and compact air sampling pump with a built-in flow meter for manual, personal or on-site sampling.

Features: Constant flow for 10 hours of continuous sampling. Extremely low noise air pump and auto shut off air pump. Integrated flow and accumulated time.

Serie 500—Aeroqual

Use: Portable air quality monitor. The air quality sensor enables accurate real-time survey of common outdoor air pollutants.

Features: 30 different interchangeable sensors.

Button Sampler—SKC

Usage: Inhalable dust collection sampler, including bioaerosol for viable or non-viable analysis. Recommended for low-level, personal or area samples.

Features: Small and light. Autoclavable. The 4 L/min flow rate improves sensitivity. Low sensitivity to wind speed and direction. Filters with pore sizes greater than 1 μm are recommended to reduce back pressure and improve sampling times with personal sample pumps.

940015—BIOTEST HYCON

Use: Microbial contamination detection and air quality testing. Recommended for routine inspections of plants, packing rooms, processing areas, air intakes.

Features: Centrifugal Rotary Air Sampler (RCS). The samples are collected on agar strips and incubated using conventional equipment and techniques. Steam sterilizable blades and drum. Speed: 4096 rpm.

AirPort Md8—Sartorius

Use: Portable air sampler for microorganism detection. Recommended for pharmaceutical industry, biotechnology, hospitals and measurements within the scope of environmental protection and occupational safety.

Features: Membrane filter and impact method. Membranes are sterile and individually packaged.

The solubility of the gelatin membrane filter allows other applications (eg. rapid microbiology, virus sampling, and sampling of high bacterial concentrations).

None of the previously described background features the functionalities and advantages that characterize the present invention. Thus, none of the commercial devices mentioned have features such as portability due to their low weight, use in uncontrolled environments, simplicity in their operation and sterilization, and the possibility of detecting the presence of viruses such as SARS-CoV-2. These features provide the claimed device with advantages over known devices, such as, it allows a large volume of sampling with respect to its size, simplicity in its handling, intuitive use, portable, safe in its handling and reliable in its application, therefore It does not require specific technical knowledge for its manipulation.

BRIEF DESCRIPTION OF THE DRAWINGS

An embodiment of the present invention is illustrated by way of example in the accompanying drawings, in which.

DETAIL DESCRIPTION OF THE INVENTION

The present invention refers to a compact and portable sampling device for detecting microorganisms such as bacteria, fungi, viruses, including SARS-CoV-2 in the air, by means of a filtering system in uncontrolled environments.

Figure 1:
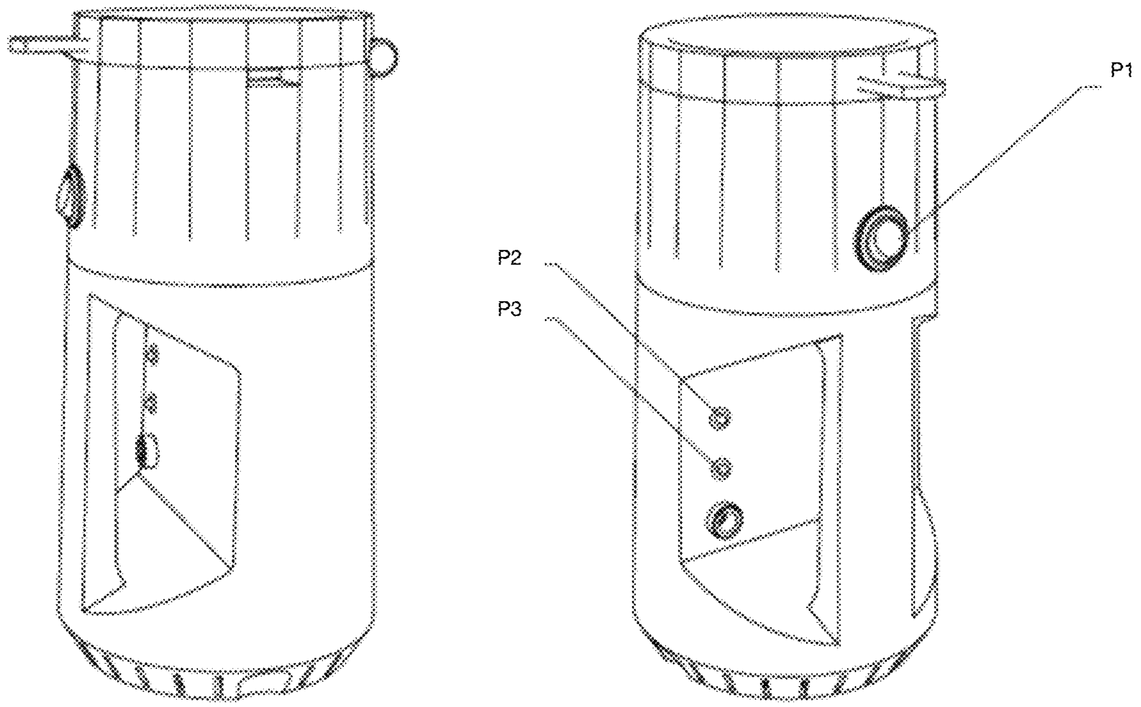
FIG. 1 illustrates an overview of the set.

In FIG. 1:

P1—On-Off switch

P2—Green light on indicates full battery

P3—Red light on indicates low battery

Figure 2:
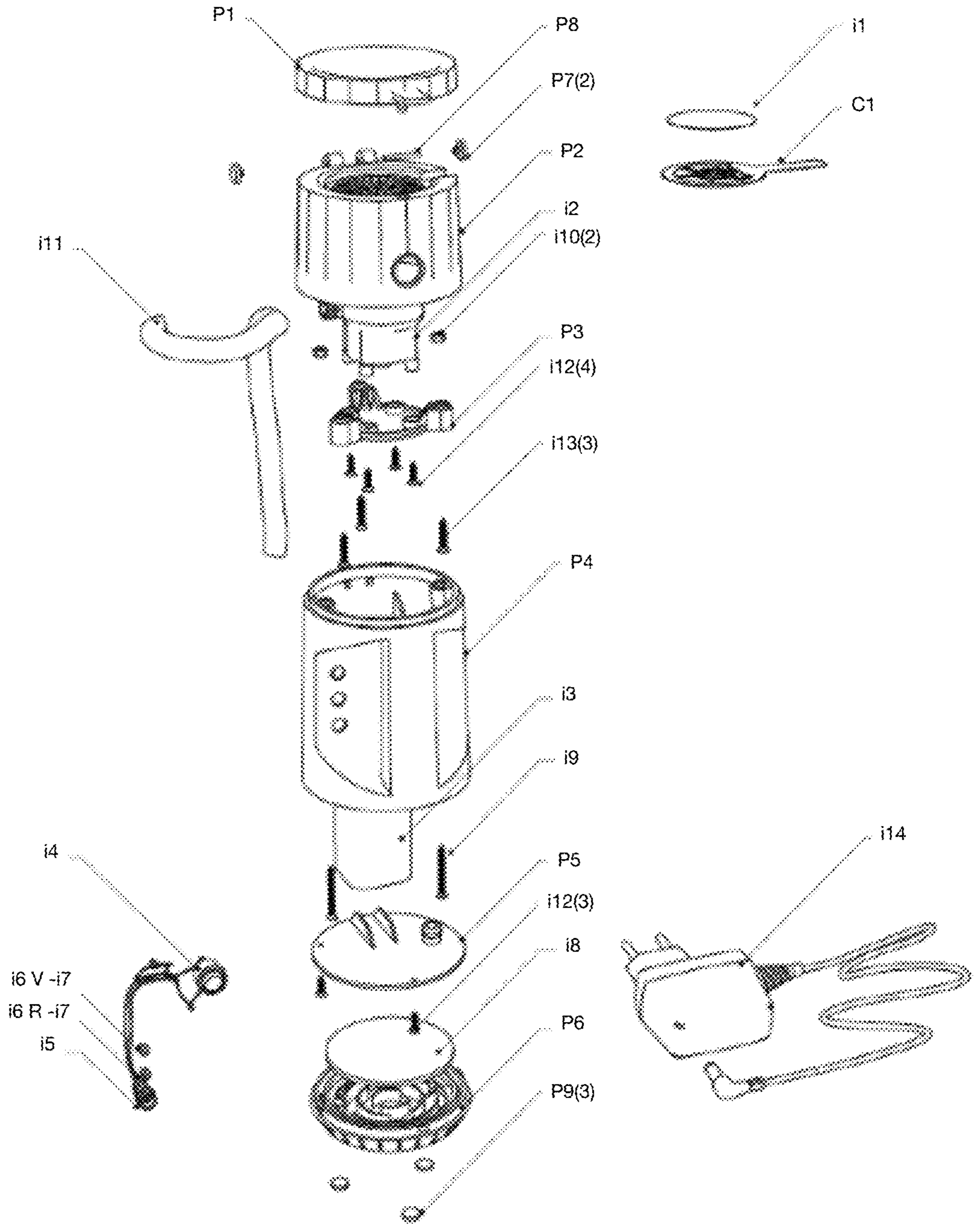
FIG. 2 shows an exploded view of the set.
Figure 3:
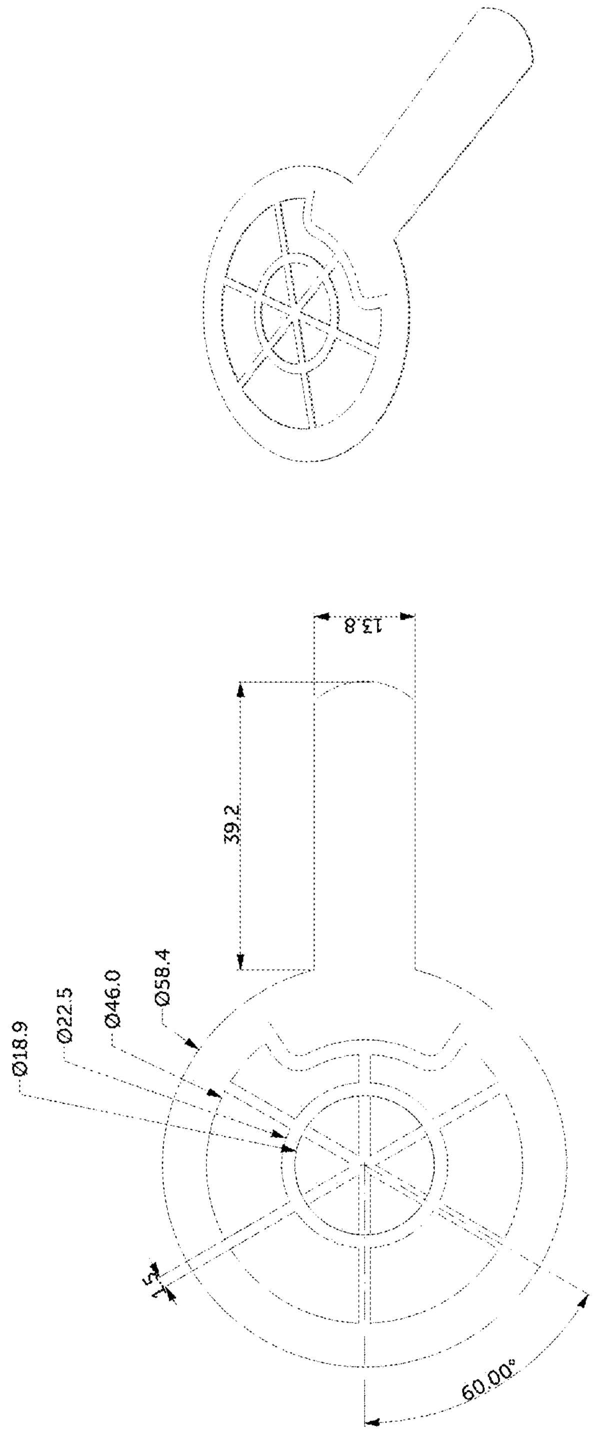
FIG. 3 shows a top and perspective view of the inlet filter support (C1) at a 1:1 scale.

In FIG. 2:

P1—Head cover
P2—Head
P3—Fan support
P4—Casing
P5—Lower support
P6—Access cover to outlet filter
P7—Hinges covers
P8—Hinge shaft
P9—Non-slip stop
C1—Inlet filter support
i1—Membrane filter of 3 μm: Particle retention for sampling
i2—Centrifugal fan: Generate enough air flow to filter
i3—Lithium battery pack with BMS: Provide power to the fan in a portable way
i4—On-Off switch: Turn on-off the device
i5—Charging connector: Battery charger connector
i6 R—Red led diode: Inform low battery status
i6 V—Green led diode: Inform full battery status
i7—Led holder: Hold led to casing
i8—Outlet filter: Avoid emission of particles to the environment
i9—Screws: Union of casing
i10—Nuts: Union of casing
i11—Silicone hose: Air flow transportation
i12—Screws: Fixing the fan to the support and the filter support to the casing
i13—Screws: Fixing fan support to the head
i14—Switched source: Battery charging In FIG. 3, the inlet filter support (C1) is made from PETG 300 μm.

Figure 4:
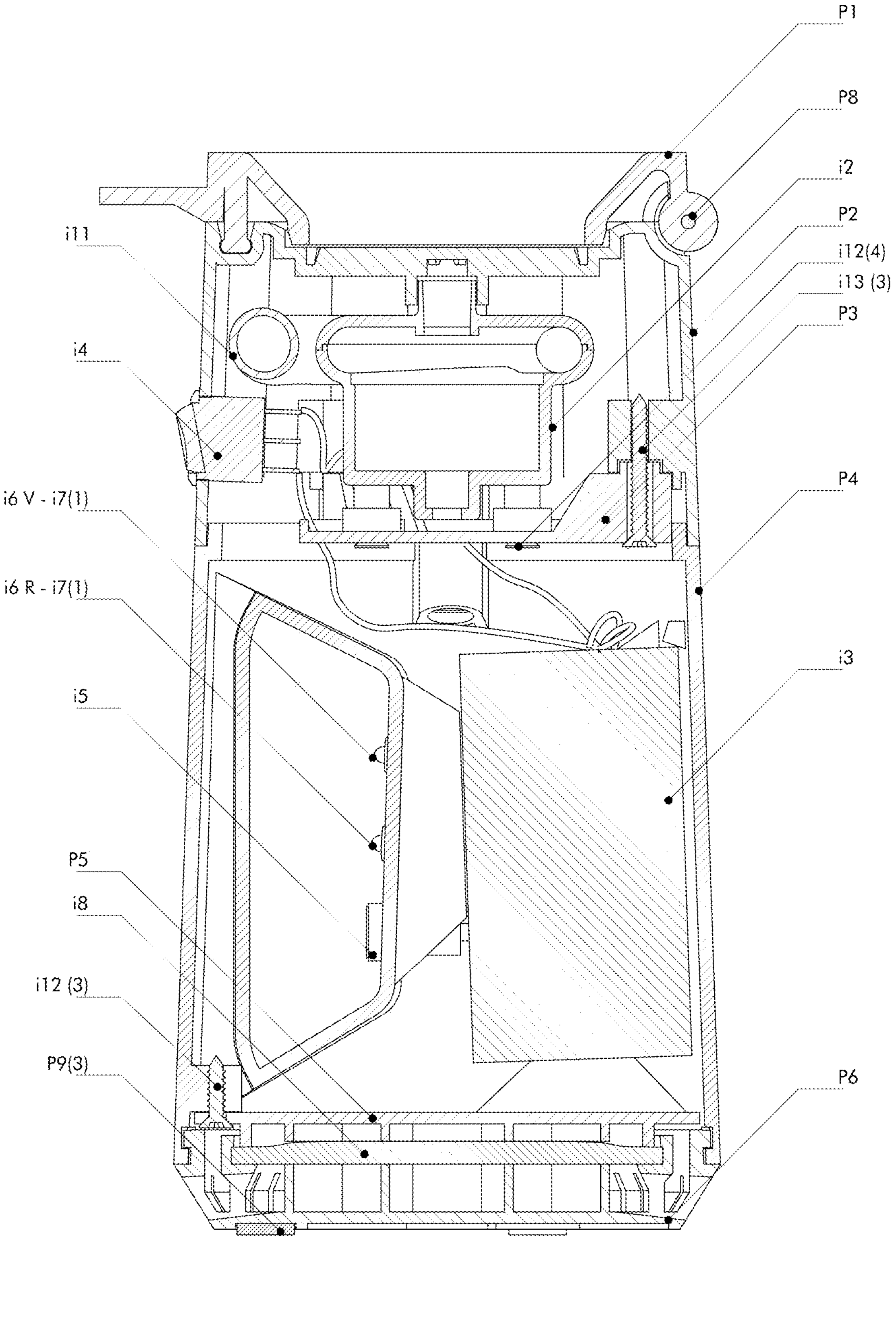
FIG. 4 shows a cross-sectional view of the set.
Figure 5:
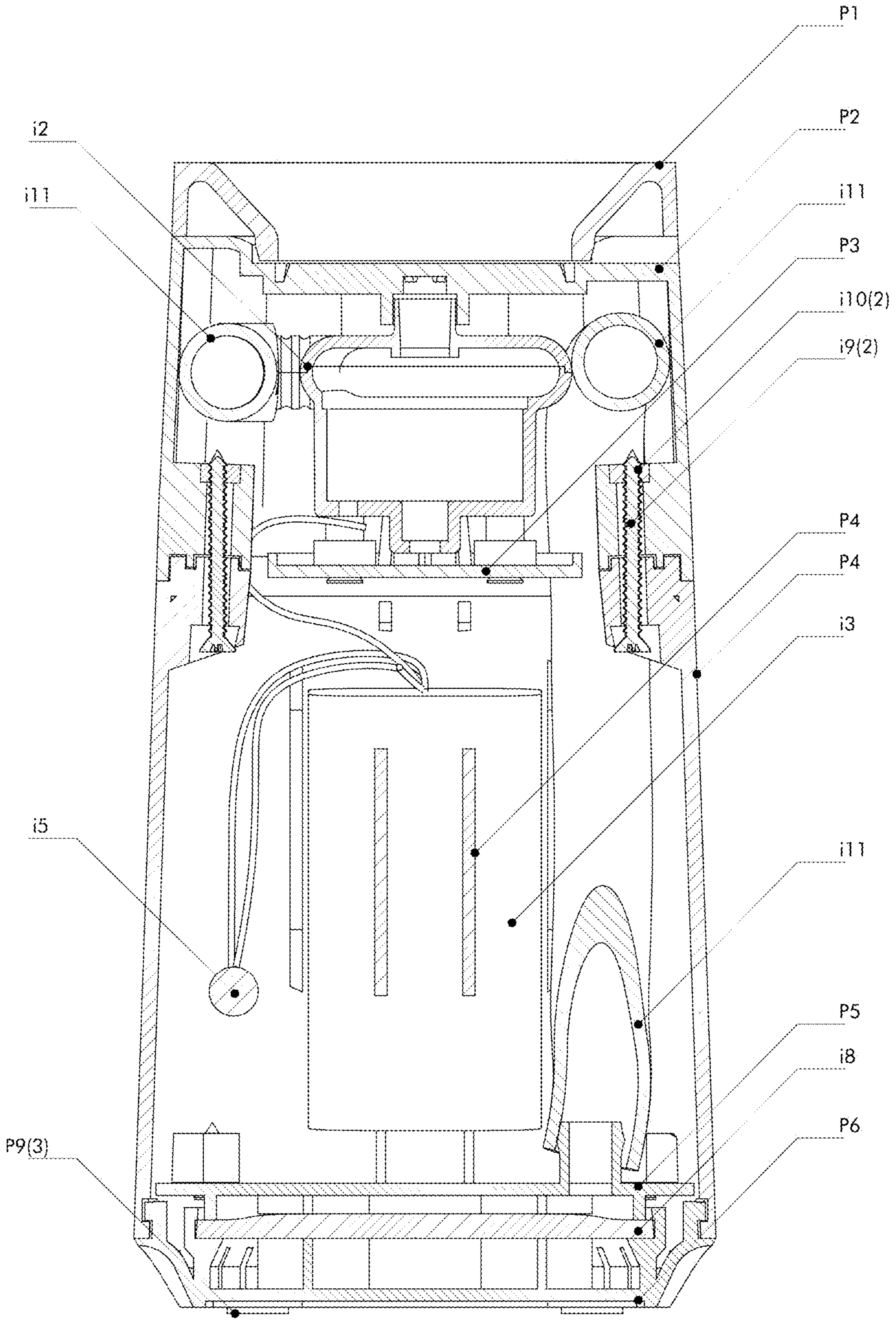
FIG. 5 shows another cross-sectional view of the set.

In FIG. 4:

P1—Head cover
P2—Head
P3—Fan support
P4—Casing
P5—Lower support
P6—Access cover to outlet filter
P7—Hinges covers
P8—Hinge shaft
P9—Non-slip stop
i1—Membrane filter of 3 μm
i2—Centrifugal fan
i3—Lithium battery pack with BMS
i4—On-Off switch
i5—Charging connector
i6 R—Red led diode
i6 V—Green led diode
i7—Led holder
i8—Outlet filter
i9—Screws
i10—Nuts
i11—Silicone hose
i12—Screws
i13—Screws In FIG. 5:

P1—Head cover
P2—Head
P3—Fan support
P4—Casing
P5—Lower support
P6—Access cover to outlet filter
P9—Non-slip stop
i2—Centrifugal fan
i3—Lithium battery pack with BMS
i5—Charging connector
i8—Outlet filter
i9—Screws
i10—Nuts
i11—Silicone hose This sampling device is intuitive and simple to use, allowing it to be used by personnel without laboratory and sampling techniques knowledge.

It has a sequence of use, operation, handling of the device and samples oriented to reliable sampling results.

The basic principle of its operation is due to the suction of a flow of air from the environment, which enters the device through the upper part of the head (2P2), perpendicular to the support area, by means of a fan (2*i*2) whose flow passes through an inlet filter (2*i*1) that retains microorganisms present in the environment, for later use in diagnostic laboratories.

After the air flow passes through the inlet filter, it is conducted through an internal hose (2*i*11) to avoid dispersion of the flow on the operating electronic components. The hose directs the flow to a chamber in the lower part of the device, in which there is an outlet filter (2*i*8).

The chamber at the bottom is designed so that the air flow circulates to the outside, passing through the positioning lines of the outlet filter (2*i*8), and escapes through the slits located radially in the cover of access (2P6).

In its design, this sampling device is made up of 8 pieces made of resin or similar by means of 3D printing or of polymers such as polypropylene (PP), polycarbonate (PC) or ABS (Acrylonitrile Butadiene Styrene) or similar by injection indistinctly. It has two main parts, separating on one side the head (2P2) and the casing (2P4) that contains the rest of the internal components. This provides two technical-production improvements: facilitating the assembly of internal components and reducing the margin of loss of parts in the production system.

The head (2P2) has a pivoting and snap-fit cover (1P1), which keeps the sampling filter (2*i*1) firmly attached to the head surface at all times. The cover is attached to the head by means of a hinge (2P7) in order to ensure that parts of the device are not removed or lost, thus simplifying its sequence of use and minimizing the possibility of contamination of parts when resting on various surfaces. Similarly, the device does not have accessory parts that could add elements that could be removed or lost.

The sampling filter is contained by a support (2C1) throughout the sampling process, facilitating its handling, and is removed when the filter is stored in the sampling bag. The filter support gives structure to the filter (2*i*1), holds it and at the same time occupies the least amount of filter surface. This support is made of plastic material, of minimum thickness and of simple manufacture, by means of punching or similar, that the user acquires as a consumable together with the filter within the same sterilized bag.

The set comprised of the head cover (2P1), the sampling filter support (2C1) and its support surface on the head, have been designed and defined millimetrically, so that there is no contact between the filter and any surface of the device.

The sampling filter (2*i*1) are replaceable commercial filters, made of nitrocellulose, cellulose or similar, with pore sizes between 1-8 microns for the retention of microorganisms and between 1-5 microns for the retention of viruses, including SARS—CoV-2, present in the environment, which can be used later in diagnostic laboratories.

The fan (2*i*2) to generate the air flow, is a centrifugal fan according to the requirements of air volume and sampling times with a balanced consumption in relation to the suction power and the size of the device with a diameter of between 40 and 60 mm, with a static pressure of between 2 and 7 Kpa, flow volume of between 100 and 150 L/min of, consumption of between 15 and 24 W, and VDC of 12 or 24.

The fan support (2P3) fixes it to the casing (2P4), in such a way that in this action the fan inlet can be wedged into the cavity that connects it to the air flow inlet. The fan is easily placed in the support thanks to the slots that position it in place, to be screwed later. Next, the support is fixed to the head (2P2), thus being secured to the device. It also allows comfortable access to the fan in case of service.

The lower support (2P5) has in the upper part an inlet for the silicone hose (**2*i*11) that conducts the air towards the outlet filtering chamber (2*i*8**), and some battery positioning partitions. In the lower part it has circular and concentric partitions, designed so that there is no dragging of the filter when the lower cover is activated. A perimeter partition near the edge of the outlet filter, makes it fit against the lower cover, thus sealing the chamber.

At the base it has an outlet filter support (2P6) to let the air flow out of the device. It is activated by twisting to open or close it. The outlet filter (**2*i*8) is secured between the lower support (2P5) and the filter access cover (2P6). When closing this screw cover, pressure is applied upwards, sealing it. In this way, the outlet filter (2*i*8**) is positioned in isolation from the rest of the internal volume of the device. The purpose of this filter is to prevent possible internal contamination of the device from being spread in the same or another uncontaminated environment.

The technological features of operation proposed in the device are minimal, in order to minimize internal electronic mechanisms and at the same time simplify the use of the device as much as possible.

It has usage indicators such as two led lights (1P2 and 1P3) that provide information on the status of the battery, a switch with a built-in graph indicating on and off (1P1), and a battery charger (**2*i*14**) (switched source) with charging indicator light.

Its sequence of use consists of:

1. The device is taken out of the box.
2. It is positioned on a smooth surface (in case of fixed sampling)/It is held by the grip (in case of mobile sampling).
3. A filter bag (inlet) is opened and the support (with the filter attached) is removed by taking it for the grip.
4. The head cover is opened by pulling the opening tab upwards.
5. The support with the filter is positioned on the head.
6. The head cover closes.
7. The device is turned on by pressing the switch.
8. Sampling is done.
9. The device is turned off by pressing the switch.
10. The head cover is opened and the support with the filter is removed.
11. Insert the filter support into the sampling bag with a skillful hand (taking care not to touch too much the inside of the bag with the support) and with the other hand from the outside of the bag, only the filter is held on both sides, at the same time that the support is removed.
12. As the filter is inserted into the sampling bag, it comes into contact with the transportation and preservation medium.
13. The sampling bag is closed and prepared to be taken to the laboratory.
14. Cleaning and disinfection protocol of the device is carried out.
15. The device is stored in the box.

The invention claimed is:

1. A filtering system for uncontrolled environments to detect microorganisms in the air including bacteria, fungi, viruses, and SARS-COV-2, the system comprising:

a portable sampler including a head defining a sampling chamber having a support surface, and a head cover configured to allow insertion and removal of a sampling inlet filter into said sampling chamber and to enclose said sampling inlet filter inside said sampling chamber; and a filter kit external from said portable sampler, said filter kit comprising the sampling inlet filter and an inlet filter support configured to removably support said sampling inlet filter, wherein said inlet filter support is positioned on the support surface of the sampling chamber during sample collection so that the head cover keeps the sampling inlet filter secured to the support surface of the head, and said inlet filter support is removed from said sampling chamber once the sample is collected; and a hose directing air flow exiting the sampling chamber to an outlet filter avoiding dispersion of the air flow on operating electronic components of the portable sampler.

2. The filtering system according to claim 1, wherein the sampling inlet filter is further placed inside a sample container after collecting the sample ensuring the stability of said collected sample.

3. The filtering system according to claim 1, wherein said inlet filter support comprises a single piece having a shape conforming to the shape of the sampling inlet filter providing structural support to the sampling inlet filter and a tab that holds and provides structure to the sampling inlet filter.

4. The filtering system according to claim 3, wherein said single piece has a circular shape.

5. The filtering system according to claim 1, wherein said inlet filter support has a shape conforming to the shape of the head cover of the portable sampler.

6. The filtering system according to claim 5, wherein said inlet filter support is made of plastic.

7. The filtering system according to claim 6, wherein said inlet filter support is made by punching.

8. The filtering system according to claim 1, wherein the head cover is hinged to said head.

9. The filtering system according to claim 1, wherein said outlet filter is positioned inside an outlet filtering chamber that includes a filter access cover configured to allow inserting said outlet filter inside the outlet filtering chamber and removing said outlet filter from the outlet filtering chamber.

10. The filtering system according to claim 1, wherein inlet filter support is positioned on the support surface of the sampling chamber to prevent contact between the inlet filter and any surface of the sampling chamber.

* * * * *